United States Patent
Gaide

(10) Patent No.: US 9,960,811 B1
(45) Date of Patent: May 1, 2018

(54) DC BIAS SIGNALS ISOLATABLE FROM TRANSMISSION PROTOCOLS

(71) Applicant: Hewlett Packard Enterprise Development LP, Houston, TX (US)

(72) Inventor: Benjamin Thomas Gaide, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days. days.

(21) Appl. No.: 15/336,666

(22) Filed: Oct. 27, 2016

(51) Int. Cl.
| | |
|---|---|
| *H04L 29/06* | (2006.01) |
| *H04B 3/54* | (2006.01) |
| *H04B 15/00* | (2006.01) |

(52) U.S. Cl.
CPC ............ *H04B 3/548* (2013.01); *H04L 69/18* (2013.01); *H04B 15/00* (2013.01)

(58) Field of Classification Search
CPC ......... G05B 2219/25217; G06F 13/387; G06F 13/4027; G06F 13/4068; H04B 17/17; H04B 3/548; H04B 15/00; H04L 69/18
See application file for complete search history.

(56) References Cited

U.S. PATENT DOCUMENTS

| | | | |
|---|---|---|---|
| 6,295,272 B1 * | 9/2001 | Feldman | ............. H04L 25/4908 370/203 |
| 7,804,793 B1 | 9/2010 | Felton | |
| 8,693,208 B2 | 4/2014 | Reinke et al. | |
| 8,837,562 B1 | 9/2014 | Betts et al. | |
| 9,411,764 B2 | 8/2016 | Andrews et al. | |
| 9,509,421 B2 * | 11/2016 | Iribe | ...................... H04B 17/17 |
| 2006/0282580 A1 * | 12/2006 | Russell, III | ........... G06F 13/387 710/62 |
| 2015/0186317 A1 * | 7/2015 | Kaufmann | .......... G06F 13/4027 710/306 |
| 2015/0220140 A1 | 8/2015 | Por et al. | |
| 2017/0025744 A1 * | 1/2017 | Becze | ................... B64C 39/024 |

OTHER PUBLICATIONS

Molex® iPass+™ HD (High-Density) Interconnects product literature, 2015 (accessible at: http://www.literature.molex.com/SQLImages/kelmscott/Molex/PDF_Images/987651-0961.PDF, last accessed Sep. 1, 2017).*
Molex® iPass+™ HD Interconnect System webpage, 2017 (accessible at: http://www.molex.com/molex/products/family?key=ipass_hd_interconnect&, last accessed Sep. 1, 2017).*
Hewlett-Packard Development Company, L.P., "Serial Attached SCSI Technologies and Architectures," (Research Paper), Technology brief, 4th edition, Aug. 24, 2011, 21 pages.

* cited by examiner

*Primary Examiner* — Michelle M Koeth
(74) *Attorney, Agent, or Firm* — Hewlett Packard Enterprise Patent Department

(57) ABSTRACT

An example device in accordance with an aspect of the present disclosure includes a direct current (DC) bias source coupled to a transmitter connector of a transmitter. The DC bias source is to apply, onto the transmission line, a DC bias signal isolatable from the transmission protocol by the receiver based on the receiver separating the DC bias signal from the transmission protocol without compromising the transmission protocol.

17 Claims, 4 Drawing Sheets

DC BIAS SIGNALS ISOLATABLE FROM TRANSMISSION PROTOCOLS

BACKGROUND

Computing systems can involve communications using various types of protocols, such as a server system using host cards able to communicate using Serial Attached Small Computer System Interface (SAS) or Peripheral Component Interconnect Express (PCIe). A type of communication link may be associated with a type of physical interface.

BRIEF DESCRIPTION OF THE DRAWINGS/FIGURES

DETAILED DESCRIPTION

Systems can use communication protocols and physical interfaces as defined by specifications. For example, the Peripheral Component Interconnect Special Interest Group (PCI SIG) adopted a port specification for external links, but the specification allows for the same physical interface to be used for carrying different, incompatible protocols (e.g., PCIe and SAS). For example, a system can use a PCIe-based storage expansion with next-generation hard drives, or another SAS-based storage expansion with current-generation hard devices. The storage expansion boxes can appear externally identical to each other, and use the same physical interface, leading to customer confusion when connecting communication cables (transmission lines).

To address such issues, examples described herein may apply a signal to the transmission line, without changing the communication protocol/standard, to inform a receiver device what type of protocol is being used, or other information (e.g., whether an incorrect connection is being used). Such signals can be interpreted by a low-speed device (e.g., a microcontroller) to obtain information about a high-speed protocol used on that transmission line, and can transmit such signals out-of-band to ensure the transmitter/receiver can set up a communication link to begin with, before the higher-level protocol is established, or even before the high-speed transmission chip is powered on. Independent positive identification of communication protocol type, prior to attempting to establish a link, enables customer-friendly multiple protocols compatible with high-speed differential buses. An example "just works" SAS and PCIE protocol external port detection and adaptation allows for customers to use "any cable that fits" and connect up SAS and PCIE devices. A connected device can understand what is connected at the other end and (if possible) adapt to that communication method/protocol, and can provide a notification of being physically connected to a device that does not share a compatible communication protocol. Enabling such out-of-band communications accommodates devices that do not support hot-plug, and accommodates devices (such as PCIe switches) that may need to be boot-strapped to know their configuration prior to connection. This example implementations described herein can be used with any high-speed communication, without a need to redesign the communication signal to accommodate or otherwise risk breaking compatibility of existing protocols.

Figure 1:
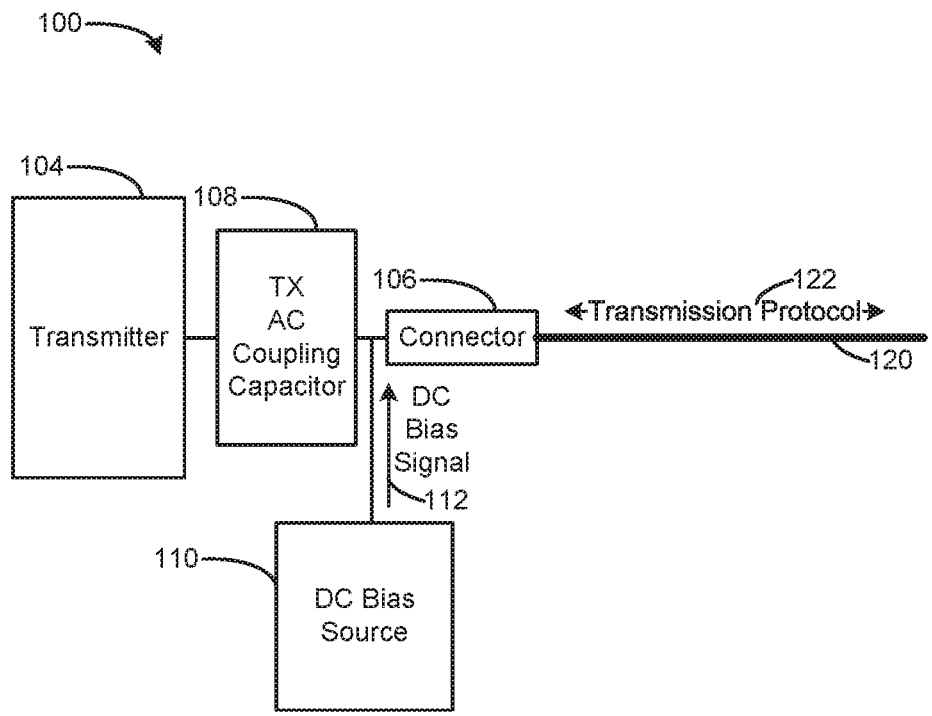
FIG. 1 is a block diagram of a system including a direct current (DC) bias source and DC bias signal according to an example.

FIG. 1 is a block diagram of a system 100 including a direct current (DC) bias source 110 and DC bias signal 112 according to an example. The DC bias source 110 is coupled to a transmitter connector 106 of a transmitter 104. The transmitter 104 is to communicate over a transmission line 120 using a transmission protocol 122 associated with use of a transmitter alternating current (AC) coupling capacitor 108 at the transmitter connector 106, and a receiver AC coupling capacitor at a receiver of a DC signal reader (see receiver AC coupling capacitor 238, receiver 230, and DC signal reader 233 of FIG. 2).

The DC bias source 110 is to apply, onto the transmission line 120, the DC bias signal 112. The DC bias signal 112 is isolatable from the transmission protocol 122 by the receiver. For example, the receiver is to separate the DC bias signal 112 from the transmission protocol 122 based on a filter (e.g., see filter 337 of FIG. 3), without compromising the transmission protocol 122. As used herein, the term "without compromising" relates to preserving integrity of the transmission protocol 122 such that the transmission protocol 122 can be efficiently received and decoded by the receiver, without incurring substantial attenuation that would negatively affect the accuracy or power level of the transmission protocol 122 to the degree that it would become unusable. The DC bias source 110 is coupled to the transmission line 120 downstream of the transmitter AC coupling capacitor 108, and upstream of the receiver AC coupling capacitor. The AC coupling capacitors can isolate DC biases at the transmission line 120.

Figure 3:
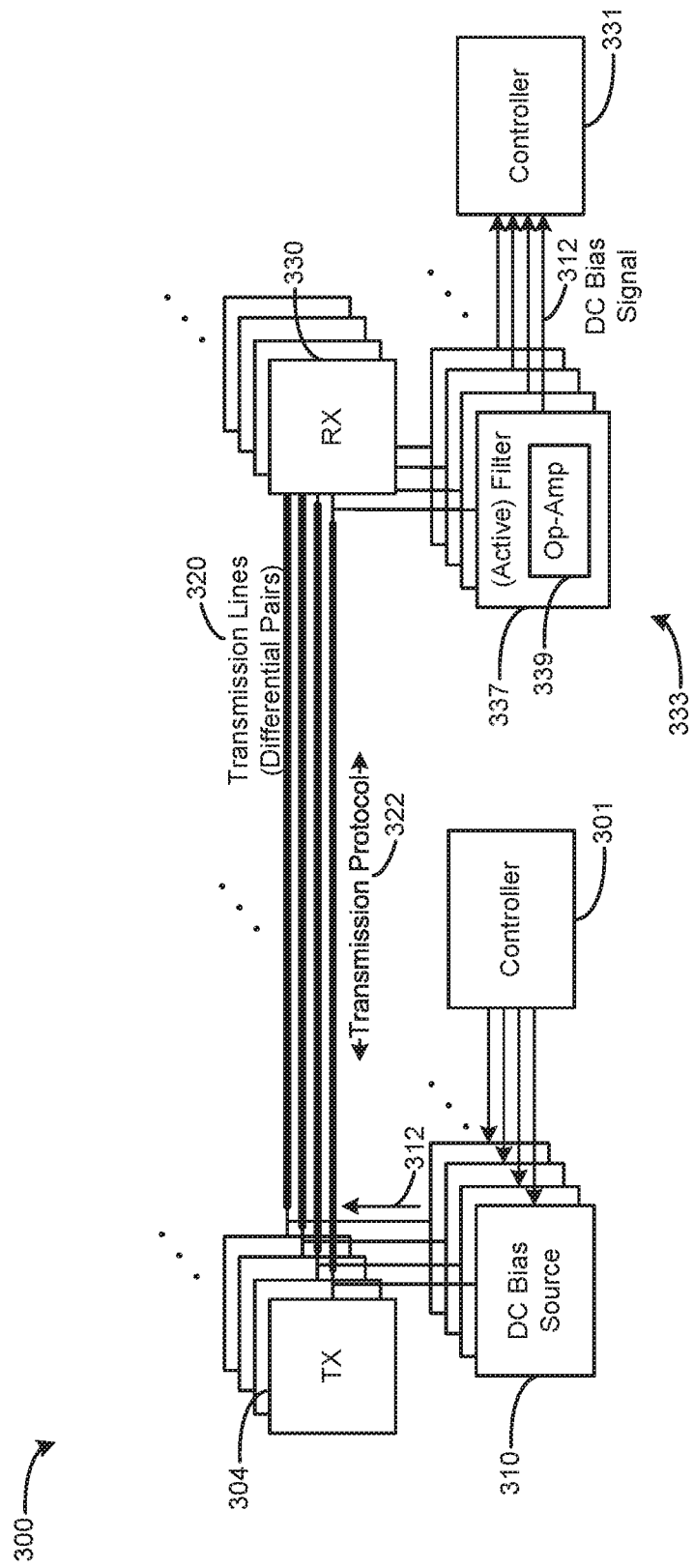
FIG. 3 is a block diagram of a system including a plurality of transmission lines and filters according to an example.

The DC bias source 110 can generate (e.g., under the control of a controller, such as controller 331 shown in FIG. 3) the DC bias signal 112 to identify a type of the transmission protocol 122 to be used from among a plurality of types of transmission protocols, independent of whether the transmission protocol 122 is being transmitted. For example, prior to powering-on the high-speed transmitter 104 and receiver, the system 100 can use a low-power controller to instruct the DC bias source 110 to generate a DC bias signal 112 to identify whether the transmission protocol 122 is Serial Attached Small Computer System Interface (SAS), or Peripheral Component Interconnect Express (PCIe). This enhances user interaction with the system 100, because such transmission protocols can be used over transmissions lines 120 (cables) having the same type of connector on either end, such that it is possible to physically plug the cable into two devices that use incompatible communication protocols (e.g., a system based on the Molex IPass® HD+ port specification adopted by the PCI SIG group, which allows for a given type of physical cable/connectors to be used to carry varying different incompatible protocols). Use of the system 100 makes it possible to signal in advance which communication protocol is going to be used by the transmitter. The system 100 thereby can enable a multi-protocol system to reconfigure itself at setup for use with the appropriate protocol, and/or a single (incompatible) protocol system to indicate that it is connected to another system using an incompatible protocol. Accordingly, it is possible to avoid issues that might arise due to user reliance on a physical type of cable to (incorrectly) attempt to infer the type of protocol carried by that physical type of cable.

The DC bias signal 112 can be applied as a DC offset to the transmission line 122, e.g., using static circuit elements such as resistors and capacitors, or active circuit elements such as operational amplifiers (op-amps), and the like. The DC bias signal 112 can be applied after the transmitter AC coupling capacitor (coupling capacitors are used on both ends of external connections for PCIe and SAS protocols), and read before the receiver AC coupling capacitor. This enables a low speed device such as a basic microcontroller (e.g., controller 331 of FIG. 3), to apply and/or isolate the DC bias signal 112 to/from the transmission line 120. Thus, the DC bias signal 112 is isolatable from the transmission protocol 122 because the DC bias signal 112 is operating at substantially different frequencies (i.e., DC) compared to the relatively high frequency used by the transmission protocol 122, that allow the DC bias signal 112 to be separated out. In alternate examples, such as the multi-line example of FIG. 3, the controller can identify multiple DC bias signals 112 sent as multi-bit signals across a plurality of transmission lines 120. Thus, the DC bias signal(s) 112 enable the controller to identify the basics of a high-speed transmission line 120, regardless of whether or when the higher-level transmission protocol 122 is established, or even before the higher-power transmitter 104 or receiver chips have been powered on.

The system 100 can represent one of the transmission lines 120 of a multi-line reference/standard PCIe or SAS Generation 3 external connection. AC coupling capacitors are used at both ends of the cable/transmission line 120, to eliminate DC bias at the receiver and/or the transmitter 104. Between the transmitter and receiver connectors 106, the DC bias source 110 is to inject a target DC bias signal 112, and on the receive side, the DC bias signal 112 is read. Because a standard SAS PCIe generation 3 external connector cable includes 4 differential pairs, each pair has two transmission lines, for a total of eight individual transmission lines, enabling for three bits and ground reference (if using each differential pair as a bit or ground), or up to seven bits and ground reference if using each individual transmission line.

The system 100 can be implemented by embedding the DC bias source 110 (and associated controller, DC signal reader, etc.) as chip(s) on a system board contained in a server, such as a separate add-on board, and/or on a main board. The system 100 also can be implemented as a printed circuit assembly on a transmitter/receiver device. For example, the system 100 can be implemented on a system board that contains the transmitter 104 and/or the receiver, and can be implemented external to the transmitter 104 and/or the receiver.

Figure 2:
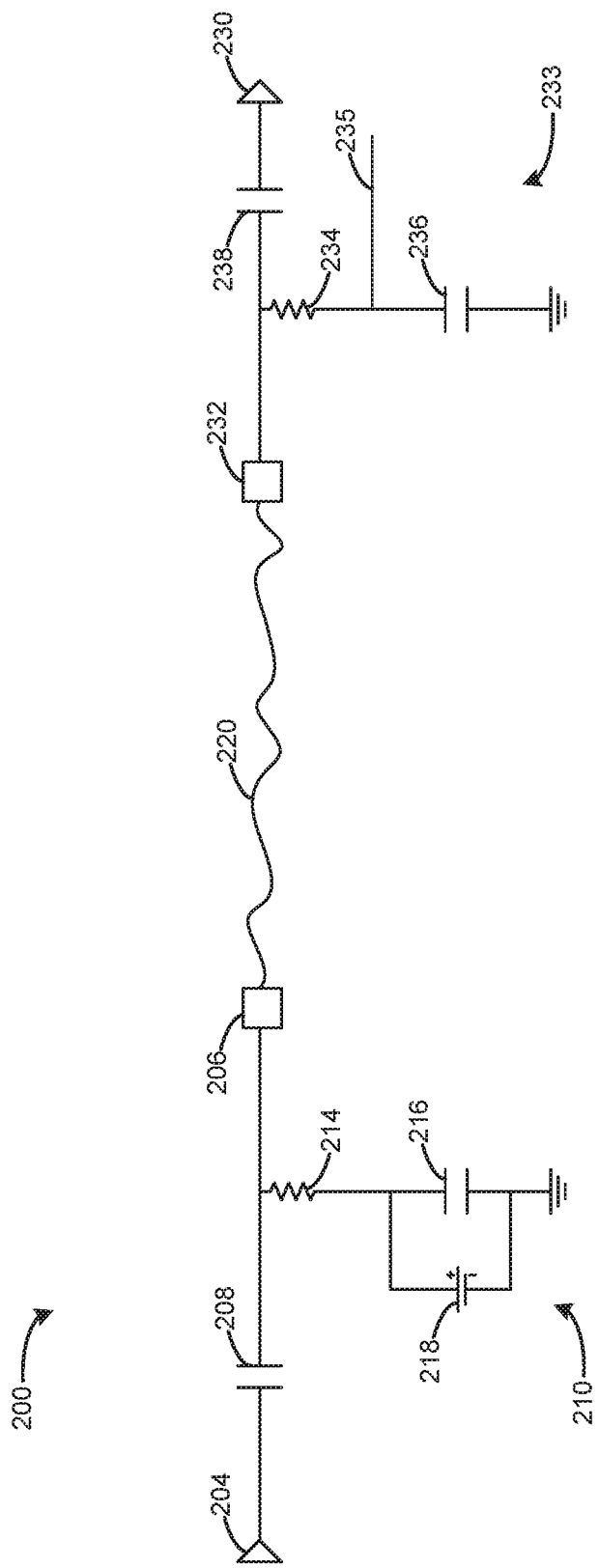
FIG. 2 is a circuit diagram of a system including a direct current (DC) bias source and state pin according to an example.

FIG. 2 is a circuit diagram of a system 200 including a direct current (DC) bias source 210 and state pin 235 according to an example. The DC bias source 210 is coupled to a transmitter connector 206 of a transmitter 204. The transmitter 204 is to communicate over a transmission line 220 associated with use of a transmitter alternating current (AC) coupling capacitor 208 at the transmitter connector 206, and a receiver AC coupling capacitor 238 at a receiver connector 232 of a receiver 230. The example DC bias source 210 illustrated in FIG. 2 includes a source resistor 214 coupled to a source filter capacitor 216 and a modulatable DC voltage source 218. A DC signal reader 233 is at the receiver 230, coupled to the receiver connector 232 to provide the DC bias signal applied by the DC bias source 210, to be isolated from a transmission protocol and output via the state pin 235. The DC signal reader 233 includes a receiver resistor 234 and a receiver filter capacitor 236. A controller (not shown in FIG. 2, see controller 331 of FIG. 3) can be coupled to the state pin 235 to interpret the DC bias signal.

The example DC bias source 210 illustrated in FIG. 2 is to apply the DC bias signal to the transmitter connector 206 based on the source resistor 214 being coupled in series to the source filter capacitor 216, to prevent signal loss of the transmission protocol. Accordingly, the DC bias source 210 is able to apply the DC bias signal onto the transmission line 220 without compromising the high-speed transmission protocol, and the values of the resistor 214 and capacitor 216 can be chosen in view of the voltage levels, switching speed, bandwidth, or other characteristics of the transmission protocol. The modulatable DC voltage source 218 is coupled in parallel with the source filter capacitor 216. The source filter capacitor 216 and DC voltage source 218 can be augmented to include an inductor to serve as a switching regulator. Alternate circuits are possible, provided the circuit components are designed not to compromise the transmission protocol.

The DC bias source 210 can apply the DC bias signal as a function of a range of the transmitter 204. In an example implementation, the transmitter 204 can support using the PCIe transmission protocol and/or the SAS transmission protocol, whose characteristics enable the use of a source resistor 214 on the order of 10 Kilo Ohms (KOhms) to avoid compromising (e.g., resulting in attenuation/losses of on the order of 5% or greater) the characteristics of the PCIe and/or SAS transmission protocols. The receiver resistor 234 can be on the order of 20 KOhms. This ensures that very little signal is lost from the transmission protocol when isolating the DC bias signal. In the illustrated example, no more than 2% loss was realized to the high-speed AC signal of the transmission protocol operating at 6 Gigahertz (GHz), and provided reliable DC bias signal voltage at the state pin 235, readable by a low power microcontroller. The receiver filter capacitor 236 is to discard high frequency signals, e.g., those signals associated with the transmission protocol. Accordingly, the various circuit components can be tailored depending on the characteristics of the high speed transmission protocol to be used. The state pin 235 can be read by a microcontroller, e.g., to establish whether the DC bias signal indicates a logic 1 or logic 0 bit. The receiver resistor 234 and the receiver filter capacitor 236 also serve to electrically protect the state pin 235, such that an off-the-shelf microcontroller can read the state pin without risking damage or compromising the transmission protocol.

The values for source resistor 214 and receiver resistor 234, in addition to being chosen in view of the transmission protocol, also can be chosen in view of each other, for functioning as a resistor divider. Additionally, on the transmitter side of the system 200 where the DC bias signal is injected, the source filter capacitor 216 can be assigned a relatively small value, to attenuate AC noise from the DC bias source 218, without adding hold up. The receiver resistor 234 is to prevent the microcontroller (not shown, to be coupled to receive output from the state pin 235), when it receives the isolated DC bias signal, from pulling down the transmission protocol signal and risking errors. Accordingly, by using a relatively large receiver filter capacitor 236 and receiver resistor 234, the microcontroller's read operation (to establish the presence/value of the DC bias signal) does not negatively impact the transmission line 220, e.g., no more than 2% loss to the high-speed AC signal of the transmission protocol at 6 GHz, while providing reliably readable voltage of the DC bias signal to be read by the microcontroller. Thus, the DC bias signal is isolatable by the DC signal reader 233 based on a receiver resistor 234 coupled to the receiver connector 232 to prevent signal loss of the transmission protocol, and a receiver filter capacitor 236 coupled in series with the receiver resistor 234 at the state pin 235, to discard high frequencies of the transmission protocol to separate the transmission protocol from the DC bias signal and enable sampling of the DC bias signal at the state pin 235.

FIG. 3 is a block diagram of a system 300 including a plurality of transmission lines 320 and filters 337 according to an example. A corresponding plurality of transmitters 304 and receivers 330 are coupled to the plurality of transmission lines 320 to carry transmission protocols 322 and DC bias signals 312. A given filter 337 of the DC signal reader 333 is illustrated in FIG. 3 as being an active filter 337 based on an operational amplifier (op-amp 339). The illustrated plurality of transmission lines 320 are arranged as a plurality of differential pairs to carry a plurality of DC bias signals 312 that are to be interpreted in parallel as a multi-bit signal. For example, transmitter controller 301 is shown directing the plurality of DC bias sources 310 to generate the plurality of DC bias signals 312, and receiver controller 331 is shown receiving the plurality of generated DC bias signals 312.

In an example implementation, the system 300 can be based on a plurality of circuits as illustrated in system 200 of FIG. 2, e.g., by replicating system 200 eight times (with one line serving as a ground reference), to transmit seven bits of information by using a corresponding eight DC bias signals 312.

The DC bias signal 312 is isolatable by the receiver 330 based on the filter 337 to prevent signal loss of the transmission protocol 322, and discard the high frequencies of the transmission protocol 322 when isolating the DC bias signals 312. The filter 337 is shown as an active filter that is based on an operational amplifier (op-amp) 339 used in a differential mode to protect the transmission protocol 322 from a sampling current that is to be used (e.g., by receiver controller 331) to read the DC bias signals 312. In alternate example implementations, the active filter 337 can be implemented using other circuit components, and is not limited to the illustrated op-amp 339 implementation.

The controller 331 can compare values to a reference value/line, e.g., by using one of the plurality of transmission lines 320 as a reference. The other transmission lines 320 can be compared relative to the reference. In an example, the reference can be chosen as 3.3 Volts, but other values can be arbitrarily chosen to serve as the reference value. The controller 331 can perform a differential measurement between a given one of the transmission lines 320, and the reference signal on the reference transmission line 320. Differences can be used to establish whether the given transmission line 320 is carrying a logic 0 or logic 1. Four transmission lines 320 are illustrated, but fewer or greater number of lines may be used in alternate example implementations. Each transmission line 320 may be used to carry a given bit, or a differential pair of transmission lines 320 may be used to carry a given bit to provide greater tolerances for the values chosen for the DC bias source, the quality of the electrical components, and so on. In an example implementation, pins 1-3 of the 4-pin Molex IPass® HD+ port specification can be used as three differential pairs for transmitting in each direction, which can be expanded to seven bits (by using each of the eight lines individually, with one reserved for reference/ground) with the extra pins reserved for later use.

Thus, The Molex IPass® HD+ port specification includes four differential pairs for transmitting in each direction, and when expanded these four differential pairs can be used to transmit high-speed SAS/PCIE transmission protocols 322, while also carrying low-speed data representing the DC bias signals 312. In the case of using four differential pairs of transmission lines 320, pair 0 can be used for ground/reference, and pairs 1-3 can be used to transmit a ground signal or high signal, to allow for three bits to be applied and sent across the transmission lines 320 independent of whether the transmission protocol 322 is active. Such a 3-bit configuration allows for a robust approach for indicating whether the transmitter 304 supports a PCIe transmission protocol, a SAS protocol, or both PCIe and SAS protocols, while leaving room for five more states to be defined as needs arise. This approach can be used to indicate other types of protocols, by assigning a given type of protocol to a given type of bit combination, as appropriate. The example configuration based on the 4-differential pair is also capable of expanding to include four additional possible bits if each line of a given differential pair is used individually. However, additional possibilities are enabled by using additional transmission lines 320, e.g., beyond the four differential pairs, or by using fewer transmission lines.

Figure 4:
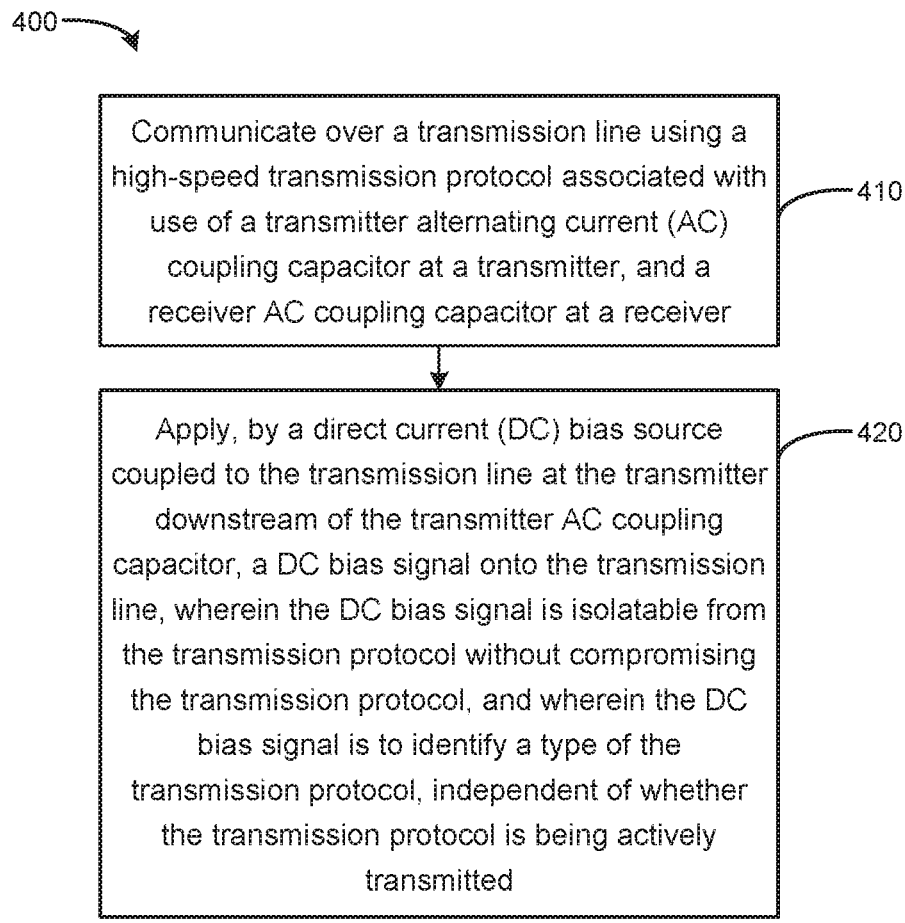
FIG. 4 is a flow chart based on applying a DC bias signal according to an example.

Referring to FIG. 4, a flow diagram is illustrated in accordance with various examples of the present disclosure. The flow diagram represents processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated.

FIG. 4 is a flow chart 400 based on applying a DC bias signal according to an example. In block 410, a high-speed transmission protocol is used to communicate over a transmission line. The high-speed transmission protocol is associated with use of a transmitter alternating current (AC) coupling capacitor at a transmitter, and a receiver AC coupling capacitor at a receiver. For example, PCIe and SAS transmission protocols can be used over transmissions lines/cables having the same type of physical connector as each other. The nature of the transmission lines and protocols dictates that AC coupling capacitors are used by the transmitter and receiver on either end of the transmission lines, to address any stray DC bias that might otherwise negatively affect the transmission protocol.

In block 420, a DC bias signal is applied onto the transmission line by a direct current (DC) bias source coupled to the transmission line at the transmitter downstream of the transmitter AC coupling capacitor. The DC bias signal is isolatable from the transmission protocol without compromising the transmission protocol. The DC bias signal is to identify a type of the transmission protocol, independent of whether the transmission protocol is being actively transmitted. For example, a DC bias source based on a resistor and capacitor can be coupled to a transmitter connector, downstream of a transmitter AC coupling capacitor, to apply a DC bias signal to the transmission line. A DC signal reader can be based on a resistor and capacitor, coupled to a receiver connector upstream of a receiver AC coupling capacitor, to provide a state pin for reading the DC bias signal. A controller can be coupled to the state pin of the DC signal reader, to identify a logic 0 or logic 1 corresponding to the isolated DC bias signal on the state pin. A single DC bias signal (single bit) can represent two logic states corresponding to two different protocol types, and a plurality of DC bias signals (plurality of bits) can be used to indicate three or more different states (e.g., representing seven states and a reference ground) corresponding to different protocol types. Additional information also can be represented, such as whether a transmission protocol is not supported, or whether a combination of transmission protocols are supported.

What is claimed is:

1. A system comprising:
a direct current (DC) bias source coupled to a transmitter connector of a transmitter, wherein the transmitter is to communicate over a transmission line using a transmission protocol associated with use of a transmitter alternating current (AC) coupling capacitor at the transmitter connector, and associated with a receiver AC coupling capacitor at a receiver,
wherein the DC bias source is to apply, onto the transmission line, a DC bias signal isolatable from the transmission protocol by the receiver based on the receiver separating the DC bias signal from the transmission protocol without compromising the transmission protocol, and
wherein, prior to the transmitter being powered on, the DC bias source is to transmit the DC bias signal to the receiver to enable the receiver to identify a logic state corresponding to the DC bias signal and determine a type of the transmission protocol to be used by the transmitter based on the logic state corresponding to the DC bias signal.

2. The system of claim 1, wherein the DC bias source is to apply the DC bias signal to the transmitter connector based on a source resistor coupled in series to a source filter capacitor, to prevent signal loss of the transmission protocol, and a modulatable DC voltage source coupled in parallel with the source filter capacitor.

3. The system of claim 1, wherein the DC bias signal is isolatable by the receiver based on a receiver resistor coupled to a receiver connector to prevent signal loss of the transmission protocol, and a receiver filter capacitor coupled in series with the receiver resistor at a state pin, to discard high frequencies of the transmission protocol to separate the transmission protocol from the DC bias signal and enable sampling of the signal at the state pin.

4. The system of claim 1, wherein the DC bias signal is isolatable by the receiver based on an active filter to prevent signal loss of the transmission protocol and discard high frequencies of the transmission protocol.

5. The system of claim 4, wherein the active filter is based on an operational amplifier (op-amp) used in a differential mode to protect the transmission protocol from a sampling current that is to read the DC bias signal.

6. The system of claim 1, wherein the type of the transmission protocol to be used by the transmitter is identified from among a plurality of types of transmission protocols, independent of whether the transmission protocol is being transmitted.

7. The system of claim 1, wherein the transmission protocol is Serial Attached Small Computer System Interface (SAS).

8. The system of claim 1, wherein the transmission protocol is Peripheral Component Interconnect Express (PCIe).

9. The system of claim 1, wherein the DC bias source is coupled to the transmission line downstream of the transmitter AC coupling capacitor, and upstream of the receiver AC coupling capacitor.

10. The system of claim 1, wherein, prior to the transmitter being powered on, a setup of the system is reconfigured based on the determined type of transmission protocol.

11. The system of claim 1, further comprising a plurality of transmission lines arranged as a plurality of differential pairs to carry a plurality of DC bias signals that are to be interpreted in parallel as a multi-bit signal.

12. A system comprising:
a DC signal reader coupled to a receiver connector of a receiver, wherein the receiver is to receive a communication over a transmission line using a transmission protocol associated with use of a receiver AC coupling capacitor at the receiver connector, and a transmitter AC coupling capacitor at a transmitter,
wherein the DC signal reader is to isolate a DC bias signal in the received communication from the transmission protocol while preserving the integrity of the transmission protocol,
wherein the DC signal reader is to identify a logic state corresponding to the isolated DC bias signal and determine a type of the transmission protocol to be used by the transmitter based on the logic state corresponding to the isolated DC bias signal, and wherein the DC bias signal is transmitted, prior to the transmitter being powered on, by a DC bias source coupled to the transmission line at the transmitter.

13. The system of claim 12, further comprising a controller to interpret a plurality of signals obtained by a plurality of respective DC signal readers on a plurality of transmissions lines.

14. A method, comprising:
establishing a connection over a transmission line between a transmitter alternating current (AC) coupling capacitor at a transmitter and a receiver AC coupling capacitor at a receiver; and
prior to the transmitter being powered on, transmitting, by a direct current (DC) bias source coupled to the transmission line at the transmitter downstream of the transmitter AC coupling capacitor, a DC bias signal onto the transmission line towards the receiver to enable the receiver to identify a logic state corresponding to the DC bias signal and determine a type of transmission protocol to be used by the transmitter based on the logic state corresponding to the DC bias signal, wherein the DC bias signal is readable independent of the transmission protocol without compromising the transmission protocol, and wherein the type of the transmission protocol is determined independent of whether the transmission protocol is being actively transmitted.

15. The method of claim 14, wherein the DC bias signal is used to identify the type of transmission protocol prior to an attempt to establish a protocol link, to enable the receiver to select a corresponding appropriate type of transmission protocol.

16. The method of claim 14, comprising:
prior to the transmitter being powered on, reconfiguring a setup of the transmitter and receiver based on the determined type of transmission protocol.

17. The system of claim 12, wherein, prior to the transmitter being powered on, a setup of the system is reconfigured based on the determined type of transmission protocol.

* * * * *